Jan. 5, 1932.   L. G. COPEMAN   1,839,651
SHARP FREEZING UNIT
Filed Sept. 12, 1928   2 Sheets-Sheet 1
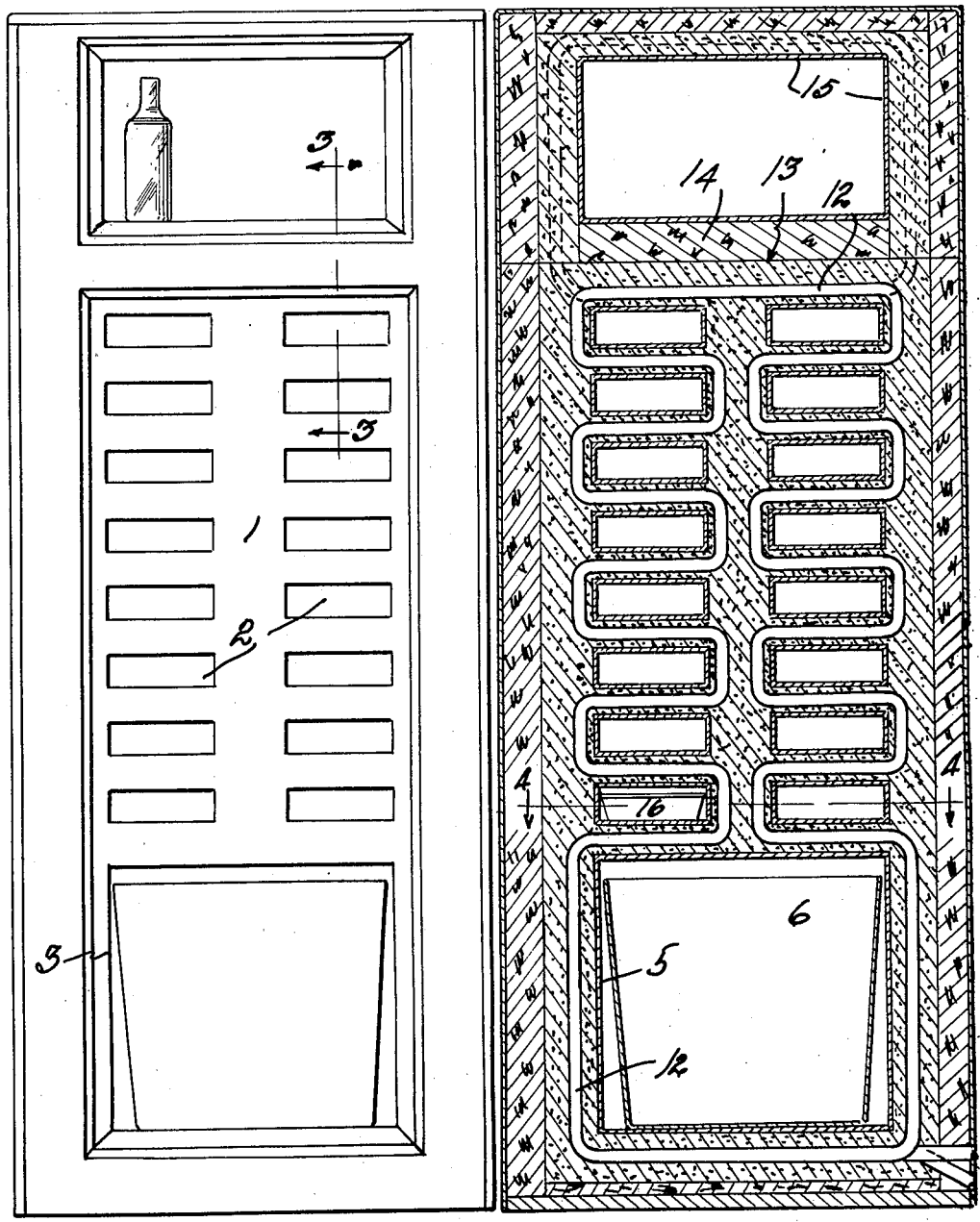

Jan. 5, 1932.  L. G. COPEMAN  1,839,651
SHARP FREEZING UNIT
Filed Sept. 12, 1928  2 Sheets-Sheet 2
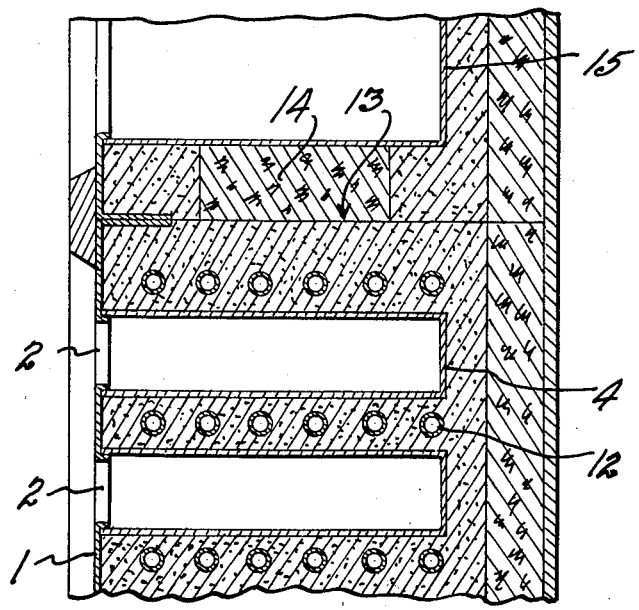
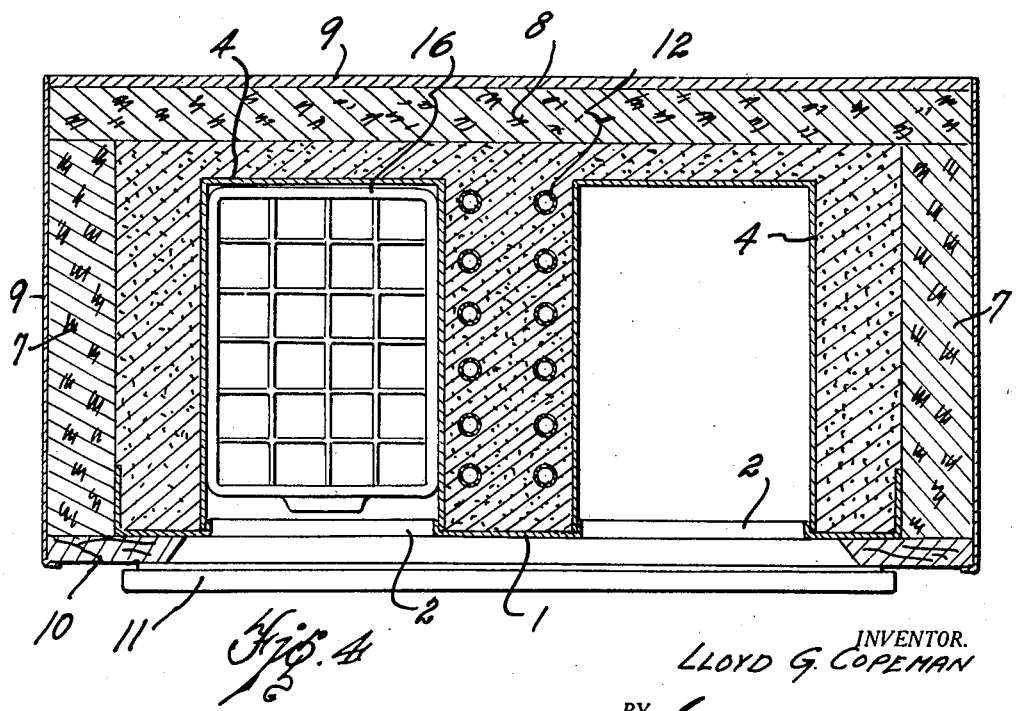
INVENTOR.
LLOYD G. COPEMAN
BY
ATTORNEY.

Patented Jan. 5, 1932

1,839,651

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

SHARP FREEZING UNIT

Application filed September 12, 1928. Serial No. 305,404.

This invention relates to a sharp freezing unit, and it has to do particularly with a refrigerator or similar unit adapted primarily to the manufacture of ice cubes and secondarily to the refrigeration of foodstuffs or liquids.

Automatic refrigerating units and particularly domestic refrigerators are usually provided with what is known as a lowside or sharp freezing chamber for the sharp freezing of ice cubes or other materials. While the different refrigerating units are provided with different types and sizes of sharp freezing units and ice-cube trays, it has been the usual custom in designing such refrigerating units to devote substantially all of the storage space for the reception of foodsuffs and the like to be cooled at a moderately low temperature, and to limit the sharp freezing capacity to a comparatively few trays. It is the object of the present invention to provide a sharp freezing unit or refrigerator which is primarily an ice maker, and the invention resides particularly in the novel arrangement and design of this sharp freezing unit, the method of operation, and transmission of heat therein, and the manner of maintaining a constant available supply of ice cubes at all times.

More specifically, the unit comprises a large number of sharp freezing chambers supported by a suitable panel, said sharp freezing chambers being adapted to receive the ice-cube trays, and in turn being embedded in a mass of artificial stone. This stone not only serves as a conductor to accelerate the freezing of the ice cubes, but also acts as a good "holdover" to maintain the cubes in frozen condition, and also acts to support the ice-cube containers in tray-receiving position.

Further specific features of this invention include the embedding of refrigerant conducting conduits in heat conducting relation with the stone, the provision of a suitable bunker chamber also positioned in the artificial stone and surrounded by refrigerating means and adapted to receive a large container or bunker for receiving ice cubes from the smaller trays whereby to maintain the collected ice cubes in a dry, usable condition; and a suitable container or chamber positioned at the top of the stone surrounding the ice-cube containers and also partially surrounded by stone whereby to maintain this upward chamber at a higher temperature, by conduction of a heat so as to maintain liquids, such as ginger ale or the like at the proper temperature without freezing.

This novel structure also embodies novel methods in the fabrication and assembly of the unit and in the manner of heat transmission.

In the drawings:

Fig. 1 is a front elevation of a sharp freezing unit constructed in accordance with the present invention and with the doors removed.

Fig. 2 is a vertical cross-section similar to Fig. 1, showing in particular the arrangement of the three different divisions of the unit, namely, the bunker, the sharp freezing containers, and the auxiliary cooling chamber, and also showing the manner of embedding the containers and the refrigerant conducting means in the artificial stone.

Fig. 3 is a fragmentary enlarged view taken on line 3—3 of Fig. 1, showing, in particular, the manner of controlling heat transmission, by conduction between the sharp freezing portion and the auxiliary cooling chamber.

Fig. 4 is a horizontal sectional view taken on line 4—4 of Fig. 2.

The refrigerator or sharp freezing unit, as embodied in the present invention, is preferably made up of a single metal front panel 1, with apertures 2 for the ice-cube forming chambers and a large aperture 3 for receiving a large container adapted to in turn receive a large hopper to be later described.

In forming the apertures 2 and 3, the edges of the panel are preferably turned inwardly, as best shown in Fig. 3, and I have provided suitable containers or receptacles 4 of the size and shape adapted to receive trays for forming ice cubes. These receptacles 4 are preferably fitted around the inturned edges of the apertures 2 and then welded or otherwise secured thereto. This same procedure is followed in connection with container 5, which is secured to the inturned edges of the aperture 3 for receiving a large hopper 6.

After the containers 4 and 5 are suitably secured to the front panel 1, it will be obvious that the refrigerator unit may then be built up of the insulating side walls 7 and the insulating back wall 8. Such side walls and back wall are of course preferably provided with some suitable covering 9 which may be sheet metal or the like. The front of the refrigerator or sharp freezing unit is, in addition to the front panel 1, provided with a suitable front cover 10 adapted to receive a suitable door or doors 11.

With the refrigerator walls or insulating walls built around the front panel, the artificial stone, preferably an oxychloride cement, is poured in a plastic state into the space between the inwardly projecting receptacles 4 and 5, and the walls as defined by the insulating material 7 and 8.

In the preferred construction of this unit, suitable refrigerant conducting coils 12 are first positioned around the receptacles 4, as best shown in Figs. 2, 3, and 4, and obviously these coils will be embedded in the artificial stone. I preferably pour enough stone so that it will come up to a point 13 and on this layer of stone, at the point 13, I place a layer of cork or other insulating material 14. This layer of insulating material is of less dimensions than the cross-sectional area of the stone at the point 13, and as best shown in Figs. 2 and 3, such insulating material may have a length equal to the length of a hollow container 15 and a width less than the width or depth of this container 15.

With the container 15 positioned above this layer of insulating material 14 and with the side and back walls of cork or other insulating material continued up, as best shown in Figs. 2 and 3, I then pour artificial stone into the spacing between the receptacle 15 and the insulating material. This stone around the sides and back of the receptacle 15 will, of course, be in direct contact with the stone around the sharp freezing receptacles 4, with the result that heat transference will be by conduction through the stone.

In my preferred construction I place the coils 12 around the sharp freezing receptacles 4 and around the hopper receptacle 5 so as to effect sharp freezing in these units. The refrigerating chamber or auxiliary cooling chamber, represented by the receptacle 15, is preferably cooled by means of heat conduction through the stone, but, if desired, suitable refrigerator conducting coils may be embedded in the stone surrounding this receptacle 15, and in Fig. 2 I have shown a continuation of such refrigerant conducting conduit in dotted lines. However, in the ordinary use of this auxiliary cooling chamber 15 the conduction through the stone will be sufficient to maintain the same at a sufficiently low temperature.

In effecting freezing of the ice cubes I preferably utilize ice-cube trays 16 of rubber or other flexible material. These trays may be formed entirely of rubber or other equivalent material, or the trays may be formed of metal and the grids formed of rubber or other flexible material, the point being that with such trays the ice cubes may be quickly and easily removed while still in a comparatively dry condition, which is in direct contrast with the usual melting condition of the ice cubes when they are removed from the standard metal ice-cube trays.

In operation, a large number of ice-cube trays are placed in their respective receptacles 4. The bunker 6 is of sufficient size to hold all of the ice cubes that may be manufactured at one time in the large number of ice cube trays. The refrigerant conduit 12 is of course connected to a suitable source of refrigerant supply and the water in the ice-cube trays will be quickly frozen. The temperature of the unit having once been brought down to a point below freezing, the large volume of stone, together with its "holdover" properties, will insure the maintenance of this temperature a relatively long time so as to insure infrequent operation of the refrigerating apparatus, and also to insure the maintenance of the ice cubes in frozen condition for a long time should the freezing apparatus fail. When the water in the trays becomes frozen the trays are merely removed and, due to the flexibility of the trays, the ice cubes may be dumped immediately in their relatively dry condition into the hopper 6. When all the ice cubes have been dumped into the hopper 6 the hopper may be returned to its normal position and the trays again filled with water for freezing.

Due to the "holdover" properties of the stone and the quick, efficient removal of the ice cubes, this fresh water will soon become frozen with the result that the unit will be able to deliver ice cubes in an almost continuous unlimited supply. The cubes having been dumped into the hopper in a dry, cold condition, and the hopper being maintained at a relatively low temperature due to the conducting properties of the stone and the positioning of the conduits, these ice cubes will not stick together; at least not to any great extent, and may be easily removed, one by one or in large quantities, as desired, to be served and used as separate ice cubes. As the ice cubes are used from the bunker it is, of course, unnecessary to dump out one or more ice-cube trays and refill the same. The hopper 6 may be fabricated from metal or rubber or other suitable material, but in either case it will be maintained at a relatively low temperature so as to prevent melting and sticking together of the ice cubes.

Heat will be abstracted from the receptacle 15 by conduction through the stone surrounding the same, whereby to maintain the temperature within the receptacle 15 at the desired temperature merely by conduction through the stone. The amount of stone surrounding the receptacle 15 and the thickness of the lining 14 will of course depend entirely upon the size of the receptacle 15 and the general operating conditions.

It will thus be obvious that I have provided an ice-making unit particularly for restaurants, clubs, and hotels, which will insure a continuous supply of ice cubes at all times. The unit is compact and inexpensive and the stone forms a three-fold purpose: that of positioning and supporting the receptacles; as a positive "holdover" medium; and as a heat conducting medium whereby to control the auxiliary cooling chamber by means of heat conduction through the stone. There is a real combination between the number and kind of ice-cube trays and the arrangement and positioning of the tray receptacles and the bunker receptacle, as the correct preserving and ready availability of the ice cubes depends upon quick removal and deposit in the bunker in a dry condition. While the bunker of course is kept at a temperature to prevent melting, if the cubes are dumped into the bunker in a melting instead of a dry condition it will be obvious that it will be difficult to remove and serve the same. The cubes, however, having once been frozen and maintained in a dry condition can be kept in such dry condition as one large mass in the bunker.

What I claim is:

1. A sharp freezing unit, comprising a mass of plastically applied stone extending substantially the height of the unit, a plurality of sharp freezing chambers formed in the stone and extending inwardly, a relatively large chamber formed in said stone below the sharp freezing chambers and adapted to receive a container of a capacity equal to all of said sharp freezing chambers, and refrigerant conducting means embedded in the stone in heat-conducting relation with said sharp freezing chambers and at least part of said large chamber.

2. A sharp freezing unit, comprising a front panel and a plurality of small apertures and a large aperture, a plurality of containers projecting inwardly from said small apertures and a single container projecting inwardly from said large aperture, a mass of stone surrounding all said containers and refrigerant-conducting means embedded in the stone in heat-conducting relation to said containers.

3. A sharp freezing unit, comprising a front panel and a plurality of small apertures and a large aperture, a plurality of containers projecting inwardly from said small apertures and a single container projecting inwardly from said large aperture, a mass of stone surrounding said containers, refrigerant conducting means positioned in heat-conducting relation to said containers, and a auxiliary cooling chamber positioned at the top of said unit and separated in part from the stone around said sharp freezing containers by insulating material whereby the temperature of said auxiliary cooling chamber will be higher than in said sharp freezing containers.

4. A sharp freezing unit, comprising a front panel and a plurality of small apertures and a large aperture, a plurality of containers projecting inwardly from said small apertures and a single container projecting inwardly from said large aperture, a mass of stone surrounding said containers, refrigerant conducting means positioned in heat-conducting relation to said containers, and an auxiliary cooling chamber positioned at the top of said unit and separated in part from the stone around said sharp freezing containers by insulating material whereby the temperature of said auxiliary cooling chamber will be higher than in said sharp freezing containers, said auxiliary cooling chamber being surrounded by stone in heat-conducting relation with the stone surrounding said sharp freezing chambers.

5. A sharp freezing unit comprising a cabinet, a vertically arranged series of sharp freezing chambers adapted to receive fluid to be frozen, a relatively large bunker chamber at the bottom of the cabinet below the sharp freezing chamber, a refrigerant conduit having substantially horizontally disposed portions, and substantially vertically disposed portions weaving in and out and between the said sharp freezing chambers whereby the sharp freezing chambers are cooled from a plurality of sides for freezing the liquid contents therein, said conduit having parts in close proximity to the bunker chamber, said bunker chamber being adapted for storage of a frozen liquid, and said bunker chamber and conduit being arranged relative to each other for sufficient heat transfer to maintain the stored frozen liquid below melting point, and a compartment at the top of the cabinet partially insulated from the conduit and sharp freezing containers to be maintained at a temperature above freezing point of the liquid.

In testimony whereof I affix my signature.

LLOYD G. COPEMAN.